United States Patent Office 3,377,361
Patented Apr. 9, 1968

3,377,361
B-NORESTROGENS
Louis R. Fare, Willingboro, N.J., and James F. Kerwin, Broomall, and Roland W. Kinney, Berwyn, Pa., assignors to Smith Kline & French Laboratories, Philadelphia, Pa., a corporation of Pennsylvania
No Drawing. Filed Apr. 2, 1965, Ser. No. 445,239
8 Claims. (Cl. 260—345.9)

ABSTRACT OF THE DISCLOSURE 3,17 - dioxygenated - B-norestra-1,3,5(10)-trienes prepared either microbiologically from B-nor-$\Delta^4$-3-ketones by means of Protaminobacter, Psuedomonas, or Nocardia organisms, or chemically from 3β,19-dihydroxy-B-norandrost-5-en-17-one. Esters and ethers are prepared by conventional chemical methods. The compounds have estrogenic and hypocholesteremic activity.

---

This invention relates to chemical compounds known as steroids. In particular, the invention relates to B-norestra-1,3,5(10)-trienes having estrogenic and hypocholesteremic activity.

The compounds of the present invention are characterized by the presence of a 5-membered B-ring, an aromatic A-ring, and certain oxygenated substituents at the 3- and 17-positions. They are thus represented by the following structural formula:

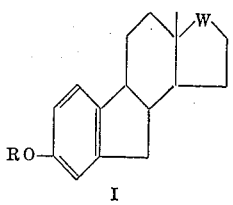

I wherein:
R is hydrogen, lower alkyl, acyl, cyclopentenyl, or tetrahydropyranyl;

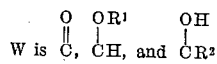

W is $\overset{O}{\underset{||}{C}}$, $\overset{OR^1}{\underset{|}{CH}}$, and $\overset{OH}{\underset{|}{CR^2}}$ $R^1$ is hydrogen, acyl, cyclopentenyl, or tetrahydropyranyl; and
$R^2$ is methyl, ethyl, or ethynyl.

The preferred compound of the invention is B-norestrone (II).

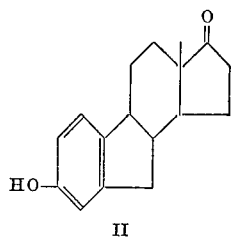

II

Another preferred compound is B-norestrone methyl ether (III)

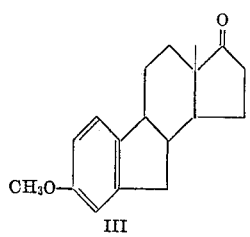

III

A further prefered compound is B-norestradiol (IV)

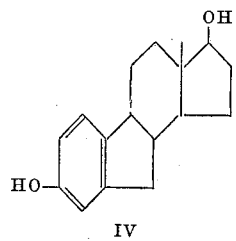

IV

For purposes of the present invention, the term lower alkyl is intended to represent those alkyl groups having up to four carbon atoms therein, and the term acyl is intended to represent those acyclic or monocyclic groups having up to about nine carbon atoms therein, including acetyl, propionyl, butyryl, heptanoyl, benzoyl, 3-cyclopentylpropionyl, and 3-phenylpropionyl.

The compounds of the invention are prepared either by microbiological or chemical methods.

When a microbiological synthesis is utilized, a B-norsteroid substrate such as 19-hydroxy-B-norandrost-4-ene-3,17-dione or 19-nor-B-norandrost-4-ene-3,17-dione is subjected to the enzymatic action of certain microorganisms. Among the microorganisms found to be useful are *Protaminobacter ruber* ATCC 8457, *Pseudomonas testosteroni* ATCC 11996, and *Nocardia corallina* ATCC 4273. Other Nocardia species may also be used. In such a microbiological process, one of these microorganisms is cultivated in or on a medium favorable to their development. Liquid media, such as nutrient broth, Trypticase Soy Broth, soybean meal broth or peanut meal broth are preferred for submerged fermentations. The media should contain sources of available carbon, nitrogen and minerals.

Carbohydrate, such as starches, dextrins and sugars including hexoses and pentoses may be used to furnish the energy and carbon requirements of the microorganisms. Other sources of carbon may also be used, for example, citric acid and its salts, sodium acetate, alcohols or fatty acids.

Sources of nitrogen in assimilable form are made available by soluble or insoluble vegetable or animal protein and protein derivatives such as soybean meal, casein, meat extracts and peptones. Amino acids, ammonium salts, nitrates, corn steep liquor or yeast extract can also be used.

Minerals naturally present in the above carbon and nitrogen sources are sufficient to satisfy the requirements of the microorganisms.

A sterile air supply should be maintained during the fermentation. This is accomplished by exposing a large surface of the growth medium to the atmosphere with constant agitation, or alternatively by the use of submerged aeration devices. Aeration at a rate of about 0.5 to 2.0 volumes of air per volume of growth medium per minute produces satisfactory results.

During the fermentaiton the temperature should be maintained within a range of about 23° C. to 32° C., preferably from about 25° C. to 30° C.

Optimum growth of the microorganisms and optimum transformation of the steroid substrates are achieved when the pH of the fermentation is maintained within a range of 6.0 to 6.8 This is accomplished by the intermittent addition of mineral acids or bases to adjust the pH, or by the incorporation of buffering agents in the fermentation medium. Buffering agents such as calcium carbonate or potassium dihydrogen phosphate may be used.

The steroid substrate to be transformed is added to the growing culture of the microorganism as a finely divided solid or in solution in a suitable solvent, such as ethanol, methanol or acetone. The addition of the steroid substrate to the microbial culture should be made under aseptic conditions. The incubation and aeration of the culture is continued in order to bring about the transformation of the steroid substrate. Alternatively, the steroid substrate may be added to the fermentation medium at the time the medium is first inoculated with the culture of microorganism.

An alternate process for the microbiological preparation of B-norestratrienes may be used. According to the method of this alternate process, one of the species of microorganisms named above is cultivated in the absence of the steroid substrates. In this case, however, the microbial species is cultivated in the presence of small amounts of other nonspecific steroid compounds such as progesterone, testosterone or androst-4-ene-3,17-dione. These nonspecific steroid compounds, generally thought to act as enzyme inducers during the period of growth and development of the microorganisms, are incorporated into the growth medium at concentrations low enough so that they are completely metabolized during growth and development of the microorganisms. Concentrations of these nonspecific steroids of about 0.1–0.25 mg./ml. may be used.

After growth and development of the microbial culture is completed, the cells of the microorganisms are collected by centrifugation or filtration, and may be washed with distilled water if desired. The cells are suspended in a buffered, nongrowth medium to which the steroid substrate is added at a concentration generally not exceeding 0.1% by weight. The same steroid substrates first named above in the original process are used. Also added to the buffered cell suspension is a compound capable of participating in enzymatic reactions by acting as an artificial electron acceptor. Such artificial electron acceptors are well-known to the art and science of enzymatic reactions, and include organic compounds such as phenazine methosulfate, methylene blue or naphthoquinone.

Incubation of the buffered cell suspension together with steroid substrate and artificial electron acceptor is carried out at a temperature of about 25° C. to about 32° C. for a period sufficient for the seroid substrate to be transformed.

The fermentation or biotransformation process is continued until the maximum amount of product has accumulated. This usually occurs within a time period of about 4–48 hours, and is most easily determined by periodic analysis of the fermentation system. This analysis can best be carried out chromatographically, as this method gives a quick and accurate representation of the types and relative concentrations of the steroid compounds present. We have used both paper and thin layer chromatography for analysis. The methods used, as cited in the examples below, are similar to those commonly used in laboratories in which biochemical or organic analyses are carried out and are well-known to persons skilled in the art.

When the steroid transformation has progressed to its maximum stage, the fermentation is terminated and the steroid compounds, both untransformed substrate and the transformation products, are recovered. This is most commonly done by extraction of the aqueous fermentation broth with organic solvents which are immiscible with water. Chloroform, methylene chloride, or methyl isobutyl ketone are most satisfactorily used. The whole fermentation broth, including microbial cells and aqueous supernatant fluid, can be extracted or, alternatively, the cellular mass of the microorganism can first be separated from the aqueous supernatant fluid by centrifugation or filtration. In the latter case, extraction of steroid compounds from the microbial cellular mass is best accomplished by a mixture of solvents, one of which is water-miscible, the other water-immiscible. We have found a 1:1 mixture of methylene chloride:ethanol most satisfactory. By extracting cells and aqueous supernatant broth separately the formation of troublesome emulsions is often avoided.

The solvent extracts are pooled and residual traces of water are removed with suitable drying agents, such as anhydrous sodium sulfate. The dried solvent extract is then concentrated in vacuo to dryness at temperatures generally not exceeding 60° C. A brownish-colored residue results which contains the steroid compounds of interest as well as solvent extractable compounds produced as a result of microbial metabolism. It is necessary to remove these contaminating materials in order to obtain the steroid compounds in a purified state.

In certain cases in which the desired steroid product is present in high concentration, purification can be achieved by direct crystallization by the use of solvents. Acetone:hexane mixtures can often be used. However, if a mixture of steroid products results from the fermentation process, of if a significant amount of untransformed steroid substrate remains, more elaborate purification procedures are required. We have used column chromatography most satisfactorily for these purifications. The methods used are known to those skilled in the art, and consist in general of the gradient elution of the steroids from a column of adsorbent material (such as silica or alumina) by mixtures of organic solvents. The presence of the separated steroidal compounds in the solvent fractions obtained after column chromatography is most easily determined by paper or thin layer chromatographic analysis of aliquot samples. The appropriate fractions containing purified steroids are pooled, concentrated in vacuo, and the purified steroids are crystallized from appropriate solvent mixtures.

The chemical preparation of the B-norestrogens is described below, with reference to Chart A.

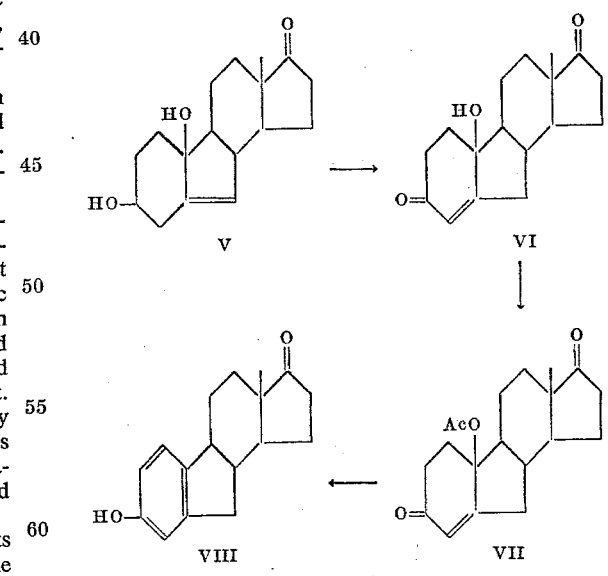

The 3-hydroxy group of 3β,19-dihydroxy-B-norandrost-5-en-17-one (V) is oxidized by means of an Oppenauer oxidation to give the hydroxy dione VI. Refluxing this compound in an organic solvent with lead tetraacetate and calcium carbonate for a period of 12–72 hours results in the formation of 19-acetoxy-19-nor-B-norandrost-4-ene-3,17-dione (VII). The A-ring is then aromatized by one of the following methods. In the preferred method, compound VII is heated at 180–230° in Dowtherm to give B-norestrone (VIII). In a second method, compound VII is allowed to sit with an alkali metal hydroxide in a solvent such as methanol. The product of this reaction is also B-norestrone. In a third alternative, compound VII is treated with a catalytic amount of an acid such as 70% perchloric acid in the presence of an anhydrous lower alkanol such as methanol. The resulting product is B-norestrone methyl ether (III).

Once the B-norestratriene system has been elaborated, various reactions known to the art are performed by chemical means to effect transformations at the 3 and/or 17-positions. The 17-keto group is reduced to the 17β-alcohol with sodium borohydride. The product is B-norestradiol (IV). The 3 and/or 17-positions esterified with lower alkanoyl or aroyl anhydrides or halides according to established techniques. Etherification with lower alkyl, cyclopentenyl, or tetrahydropyranyl groups is readily accomplished by known methods. 17α-methyl, ethyl, or ethynyl groups are introduced by reacting the appropriate standard Grignard or organometallic reagents with the 17-ketone.

The B-norestratrienes of the present invention are administered in the form of tablets or capsules containing effective, but nontoxic amounts of steroid mixed with a solid carrier. The carrier contains one or more standard ingredients such as starch, sugar, gums, etc. They are also administered in an oil solution such as sesame oil. They may also be administered by subcutaneous or intramuscular injection.

The following examples are illustrative of the preparation of the compounds of the invention, but are not to be considered as limiting the scope thereof.

Example I.—B-norestrone

One ml. of a stock broth culture of *Protaminobacter ruber* ATCC 8457 is inoculated into 50 ml. of Trypticase Soy Broth (Baltimore Biological Laboratories) contained in a 250 ml. flask, and incubated 24 hours at 250° C. on a gyrorotary shaker describing a 2-inch circle at 200 r.p.m. This culture is in turn used to inoculate 500 ml. of the same medium, which is shaken 24–48 hours at 25° C. Six liters of sterile Trypticase Soy Broth in a glass jar fermenter (10 liter capacity, New Brunswick Scientific Co.) is inoculated with the above 500 ml. culture. The fermenter is aerated with sterile air at a rate of 0.5 v.v.m. (volume of air per volume of medium per minute), and agitated at 200 r.p.m. in a water bath maintained at 30° C.±1° C.

After 24 hours cultivation 3.85 g. of 19-hydroxy-B-norandrost-4-ene-3,17-dione dissolved in ethanol is added to the culture. During the incubation period, the transformation is monitored by taking 1 ml. samples and extracting these with 0.2 ml. of methyl isobutyl ketone (MIBK). 5 microliters of the MIBK extracts are spotted on silica gel G thin layer chromatography plates and developed in a mixture of cyclohexane:ethyl acetate (1:1). After development, the plates are sprayed with 40% $H_2SO_4$ in ethanol to detect the presence of steroid compounds.

The fermentation is terminated nine hours after substrate addition. The broth is centrifuged so that the cells and liquid phase can be treated separately. The cells are extracted with 250 ml. of ethanol:methylene chloride (1:1). This extract is combined with the extract of the liquid phase. The liquid phase is acidified with phosphoric acid to ca. pH 3.0, and then extracted twice with equal volumes of methylene chloride. The solvent extract is evaporated to a volume of approximately one liter. The methylene chloride phase is then extracted 3 times with 300 ml. portions of 1 N sodium hydroxide. The alkaline extract is acidified with phosphoric acid to approximately pH 3.0 and extracted 4 times with 300 ml. portions of methylene chloride. After drying the extract, it is evaporated to dryness.

The residue is dissolved in benzene and absorbed on a column of silica gel. The material eluted with benzene is discarded while the material eluted with benzene-ethyl acetate (9:1) is combined and recrystallized from acetone-hexane to give B-norestrone, M.P. 275–277°, U.V.: $\lambda_{max}$ 282 mμ ($\epsilon$ 3,100).

Example 2.—B-norestrone

The process is carried out essentially as in Example 1 except that 19-nor-B-norandrost-4-ene-3,17-dione is used as the steroid substrate. The transformation is carried out using 100 ml. cultures in 500 ml. shaken flasks. The steroid substrate is added to give a final concentration of 50 mg./flask. The product is recovered as in Example 1.

Example 3.—B-norestrone

The transformation is carried out essentially as in Example 2 except that *Pseudomonas testosteroni* ATCC 11996 is used as the transforming microorganism. The product is recovered as in Example 1.

Example 4.—B-norestrone

The transformation is carried out essentially as in Example 3 except that 19-hydroxy-B-norandrost-ene-3,17-dione is used as the substrate. The product is recovered as in Example 1.

Example 5.—B-norestrone

The process is carried out essentially as in Example 4 except that the transforming microorganism is *Nocardia corallina* ATCC 4273. The product is recovered as in Example 1.

Example 6.—B-norestrone

A sterile nutrient broth (500 ml.) is inoculated with a culture of *Norcardia corallina* ATCC 4273 and incubated at 25° C. for 24 hours on a gyrorotary shaker. Progesterone (100 mg.) dissolved in 1.0 ml. of dimethylformamide is added to the culture as an inducing agent, and the incubation is continued an additional 48 hours. The cells of this culture are harvested by centrifugation, and stored as a paste at −20° C.

The frozen cell paste (1.0 g.) is suspended in 3.5 ml. of 0.03 M phosphate buffer (pH 7.0). To this suspension is added 1.0 mg. of 19 - hydroxy - B - norandrost - 4 - ene-3,17-dione in 0.5 ml. dimethylformamide, followed by 0.1 ml. of a solution of phenazine methosulfate. The phenazine methosulfate solution is prepared by dissolving 10 mg. of phenazine methosulfate in 1.0 ml. of 0.03 M phosphate buffer (pH 7.0).

The complete reaction mixture is shaken at 25° C. for 3 hours.

Accumulation of the desired product, B-norestrone, is detected by thin layer chromatographic analysis.

The product is recovered as described previously in Example 1.

Example 7.—B-norestrone

A solution of 34.4 g. of 3β,19-dihydroxy-B-norandrost-5-en-17-one in 172 ml. of cyclohexanone and 1000 ml. of toluene is slowly distilled until 700 ml. is collected. Then 8.6 g. of finely powdered aluminum isopropoxide is added and distillation is resumed for 20 minutes. The reaction mixture is cooled to 80° and 9 ml. of water is added. Filtration removes the precipitated aluminum salts and the filtrate is then steam-distilled until the distillate is clear. The nonvolatile portion is extracted with ethyl acetate. The evaporation of the combined and dried organic extracts gives 19-hydroxy-B-norandrost-4-ene-3,17-dione (VI), M.P. 178–80°, after recrystallization from acetone-hexane.

A suspension of 10 g. of lead tetraacetate and 10 g. of calcium carbonate in 1 l. of benzene is refluxed under a nitrogen atmosphere for 0.5 hour. Then 5 g. of 19-hydroxy-B-norandrost-4-ene-3,17-dione is added and refluxing is continued for 48 hours. The cooled mixture is filtered and the filtrate is washed with aqueous potassium iodide, then sodium carbonate, and finally water. After drying the organic phase and evaporating the solvent under reduced pressure, crude 19-acetoxy-B-norandrost-4-ene-3,17-dione (VII) is obtained.

Without further purification this compound is dissolved in 60 ml. of Dowtherm, heated at 210° for 1 hour under nitrogen, cooled, diluted with 100 ml. of ether and extracted 4 times with 2 N aqueous sodium hydroxide. The combined aqueous extracts are acidified with concentrated hydrochloric acid and filtered to give B-norestrone which, after purification by recrystallization from methanol, melts at 275–277° C. Alternatively, the 19-acetoxy compound VII is converted to B-norestrone by dissolving it in methanol containing sodium hydroxide. After 3 hours at room temperature, the reaction mixture is neutralized with acetic acid and the precipitate of B-norestrone is collected by filtration.

Example 8.—B-norestradiol

A suspension of 100 mg. of B-norestrone in 35 ml. of methanol is treated with 100 mg. of sodium borohydride in 3 ml. of water. After stirring for 0.5 hour, the reaction mixture is acidified with acetic acid, evaporated to dryness, diluted with water, and filtered. The filter cake is washed with water, dried and recrystallized from methanol to give B-norestradiol, M.P. 200–201° C.

Example 9.—B-norestrone methyl ether

A solution of 1 g. of crude 19-acetoxy-B-norandrost-4-ene-3,17-dione in 20 ml. of anhydrous methanol is treated with 5 drops of 70% perchloric acid. After 24 hours at room temperature, the solution is diluted with water and extracted with methylene chloride. Evaporation of the dried methylene chloride extracts gives the crude product which is purified by chromatography on alumina followed by recrystallization from acetone-hexane to give B-norestrone methyl ether.

Example 10.—B-norestradiol 3,17-bis(tetrahydropyran-2-yl ether) and 17-tetrahydropyran-2-yl-ether The 3,17-bis(tetrahydropyran-2-yl ether) of B-norestradiol is prepared by treating 1 g. of B-norestradiol in 100 ml. of benzene with 20 mg. of p-toluenesulfonic acid and 1.5 ml. of dihydropyran. After stirring for 8 hours at room temperature, the solution is washed with dilute sodium bicarbonate solution, dried and evaporated. The residue is recrystallized from acetone-hexane to give the product.

Similarly, the 17-tetrahydropyran-2-yl-ether of B-norestradiol is prepared by using a little less than 1 equivalent of dihydropyran and heating the reaction mixture at reflux for 8 hours.

Example 11.—B-norestrone tetrahydropyran-2-yl ether and B-norestradiol 3-tetrahydropyran-2-yl ether The tetrahydropyran-2-yl ether of B-norestrone is prepared in the manner described for the bis(tetrahydropyran-2-yl ether) of B-norestradiol. The product is reduced with sodium borohydride as described for the reduction of B-norestrone to give the 3-tetrahydropyran-2-yl ether of B-norestradiol.

Example 12.—B-norestradiol bis(cyclopent-1-enyl ether), B-norestrone cyclopent-1-enyl ether, and B-norestradiol 3-cyclopent-1-enyl ether The bis(cyclopent-1-enyl ether) of B-norestradiol is prepared by heating the diethyl ketal of cyclopentanone with B-norestradiol. 1.2 g. of B-norestradiol and 5 ml. of the diethyl ketal of cyclopentanone is very slowly distilled under nitrogen so that most of the distillate is collected during 6 hours. The residue is recrystallized from methanol containing a little pyridine. The cyclopent-1-enyl ether of B-norestrone is prepared in a similar manner. Reduction with sodium borohydride gives the 3-cyclopent-1-enyl ether of B-norestradiol.

Example 13.—17α-methyl-B-norestradiol

A solution of 1.3 g. of B-norestrone in 60 ml. of anhydrous tetrahydrofuran is treated with 5 ml. of 3 M ethereal methyl magnesium bromide. The reaction mixture is slowly distilled under a nitrogen atmosphere until the reaction temperature reaches the boiling point of tetrahydrofuran. Heating is continued for a total of 4 hours and the cooled reaction mixture is poured into ice water, acidified with dilute phosphoric acid and extracted with ethyl acetate. Evaporation of the dried ethyl acetate extracts gives the product, 17α-methyl-B-norestradiol which is recrystallized from methanol. Substitution of ethyl magnesium bromide in the above procedure results in the formation of 17α-ethyl-B-norestradiol.

Example 14.—17α-ethynyl-B-norestradiol

To a suspension of 1.75 g. of commercial lithium acetylide-ethylene diamine complex in 30 ml. of dimethyl sulfoxide is added 1.0 g. of B-norestrone. The reaction mixture is stirred under nitrogen for 12 hours, poured into ice water, acidified with dilute phosphoric acid and extracted with ethyl acetate. Evaporation of the dried ethyl acetate extracts gives 17α-ethynyl-B-norestradiol which is crystallized from acetone-hexane.

Example 15

The 17-alkanoic esters of B-norestrone and the 3,17-dialkanoic esters of B-norestradiol are most conveniently prepared by dissolving 1 part of the steroid in a mixture of 3 parts of pyridine and 2 parts of the alkanoic anhydride. After standing at room temperature for 12 hours the solution is poured into 30 parts of ice water and the ester is collected by filtration.

Example 16.—B-norestradiol bis(3-cyclopentylpropionate)

B-norestradiol bis(3-cyclopentylpropionate) is prepared by adding 2 parts of 3-cyclopentylpropionyl chloride to 1 part of B-norestradiol in pyridine. After standing at room temperature for 12 hours, the solution is poured into water and the precipitated product filtered off.

Example 17.—B-norestrone benzoate

B-norestrone benzoate is prepared by adding 1 part of benzoyl chloride to an aqueous mixture of 1 part of estrone and 1 part of sodium hydroxide. After standing at room temperature for 12 hours, the precipitated product is filtered off.

Example 18.—B-norestrone methyl ether

B-norestrone methyl ether is prepared by adding dimethyl sulfate to a mixture of estrone, methanol, and potassium carbonate. The reaction mixture is refluxed for 1 hour and the precipitated product filtered off.

Example 19.—3β,19-dihydroxy-B-norandrost-5-en-17-one

To a solution of 43.6 g. of 3β,19-diacetoxyandrost-5-en-17-one [J. Kalvoda et al., Helv. Chim. Acta., 46, 1361 (1963)] in 300 ml. of chloroform is added 25.8 g. of m-chloroperbenzoic acid in 150 ml. of chloroform. The addition is carried out with stirring so that the temperature of the reaction mixture is maintained at 25–30° C. After addition is complete, the reaction mixture is allowed to stand for 3 hours and is then washed with aqueous sodium sulfite and then with aqueous sodium carbonate solution. Drying and evaporation of the chloroform phase gives a residue which is crystallized from acetone-hexane to give 3β,19-diacetoxy-5,6-epoxyandrostan-17-one, M.P. 128–129° C.

To a stirred solution of 3β,19-diacetoxy-5,6-epoxyandrostan-17-one (42 g.) in 1200 ml. of methyl ethyl ketone is added aqueous chromic acid (50 g. of chromium trioxide in 100 ml. of water) at such a rate that the temperature of the reaction mixture does not exceed 40° C. After addition is complete, the reaction mixture is maintained at 40° C. for 1 hour and is then poured into 2500 ml. of water. Extraction with methylene chloride followed by drying and evaporation of the organic extracts gives crude 3β,19-diacetoxy-5α-hydroxy-androstane-6,17-dione, which may be used in the next step without purification.

To a solution 42 g. of the crude dione in 200 ml. of chloroform is added 50 g. of m-chloroperbenzoic acid in 350 ml. of chloroform. The addition is carried out slowly with stirring so that the reaction temperature does not rise above 30° C. After stirring at room temperature for 24 hours, the reaction mixture is washed with 10% aqueous sodium sulfite solution (500 ml.) and then with 5% aqueous sodium bicarbonate solution (700 ml.). The sodium bicarbonate phase is acidified with phosphoric acid and extracted with chloroform to give, after drying and evaporation of the chloroform, a mixture of m-chlorobenzoic acid and 3β,19-diacetoxy-5,17-dioxo-5,6-seco-androstan-6-oic acid.

The above mixture is dissolved in 150 ml. of pyridine and treated with 50 ml. of benzoyl chloride with cooling. After standing for 24 hours at room temperature, the reaction mixture is poured into 1500 ml. of water and extracted with methylene chloride. After washing with cold aqueous phosphoric acid and sodium carbonate solutions the methylene extracts are combined, dried and evaporated. The residue may be crystallized from ether to give 3β,19-diacetoxy-5β-hydroxy-17-oxo-B-norandrostan-6-oic acid 5,6-lactone (M.P. 170° C. dec.) or, more conveniently, the crude residue is heated at 190° C., under a nitrogen atmosphere for 10 minutes to give crude 3β,19-diacetoxy-B-norandrost-5-en-17-one which is dissolved in ethanol containing excess aqueous potassium hydroxide solution and heated at reflux for 2 hours. The cooled reaction mixture is poured into water and extracted with methylene chloride to give, after drying and evaporation of the methylene chloride phase, 8.5 g. of a residue. This material is dissolved in benzene-methylene chloride (9:1) and chromatographed on 125 g. of alumina (III, Woelm). Elution with methylene chloride and methylene chloride-methanol mixtures gives 3β,19-dihydroxy-B-norandrost-5-en-17-one which, after recrystallization from acetone-hexane, melts at 148–150° C.

Example 20.—19-nor-B-norandrost-4-ene-3,17-dione

3β,19-dihydroxy-B-norandrost-5-en-17-one (4.0 g.) is dissolved in 35 ml. of acetone and added to a solution of 12 ml. of standard chromic acid reagent (26.7 g. of chromium trioxide and 23 ml. of concentrated sulfuric acid diluted to 100 ml. with water) in 40 ml. of acetone at 0° C. After stirring for 6 minutes, the reaction mixture is poured into water and extracted with methylene chloride. The methylene chloride extracts are combined and extracted with aqueous sodium bicarbonate solution which on acidification and extraction with methylene chloride yields 3,17-dioxo-B-norandrost-5-en-19-oic acid after drying and evaporation of the solvent.

The crude acid is dissolved in pyridine and heated at reflux for 1 hour. The pyridine is evaporated at reduced pressure to leave a residue of 19-nor-B-norandrost-5(10)-ene-3,17-dione.

The diketone is dissolved in 50 ml. of methanol containing 0.1 g. of sodium methoxide, then heated at reflux for 1 hour. The cooled reaction mixture is poured into water and extracted with methylene chloride. Drying and evaporation of the methylene chloride extracts gives a residue which is purified by column chromatography on alumina, followed by crystallization from acetone-hexane to give 19-nor-B-norandrost-4-ene-3,17-dione, M.P. 150–3° C.

We claim:
1. A B-norsteroid of the structure

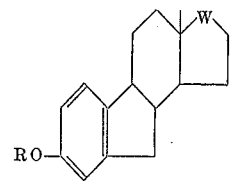

wherein

R is selected from the group consisting of hydrogen, lower alkyl, acylic or monocylic acyl of up to 9 carbon atoms, cyclopentenyl, and tetrahydropyranyl;

W is selected from the group consisting of

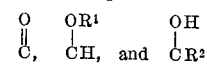

$R^1$ is selected from the group consisting of hydrogen, acylic or monocyclic acyl of up to 9 carbon atoms, cyclopentenyl, and tetrahydropyranyl; and $R^2$ is selected from the group consisting of methyl, ethyl, and ethynyl.

2. A B-norsteroid of the structure

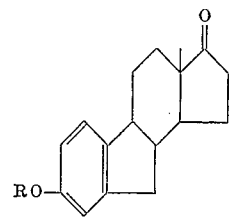

where R is lower alkyl.

3. A B-norsteroid of the structure

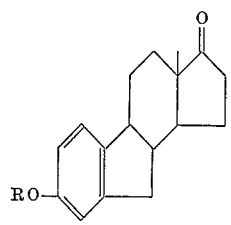

where R is acyclic or monocyclic acyl of up to 9 carbon atoms.

4. B-norestrone.
5. B-norestradiol.
6. B-norestrone methyl ether.
7. B-norestrone cyclopent-1-enyl ether.
8. B-norestrone tetrahydropyran-2-yl ether.

References Cited

UNITED STATES PATENTS 3,291,836  12/1966  Tadanier _____ 260—590

OTHER REFERENCES

Joska et al.: Collection Czech. Chem. Commun., vol. 28, pp. 82–88 (1963).

The Merck Index, 7th ed., Merck & Co., Inc., Rahway, N.J. (1960) pp. 416–419.

Saunders et al.: Steroids, pp. 687–98 (1964) QP801. S6S7.

JOHN D. RANDOLPH, Primary Examiner.

W. A. MODANCE, Examiner.

J. M. FORD, Assistant Examiner.